D. A. FOLTZ & A. MILLER.
SHEARS.
No. 192,426. Patented June 26, 1877.
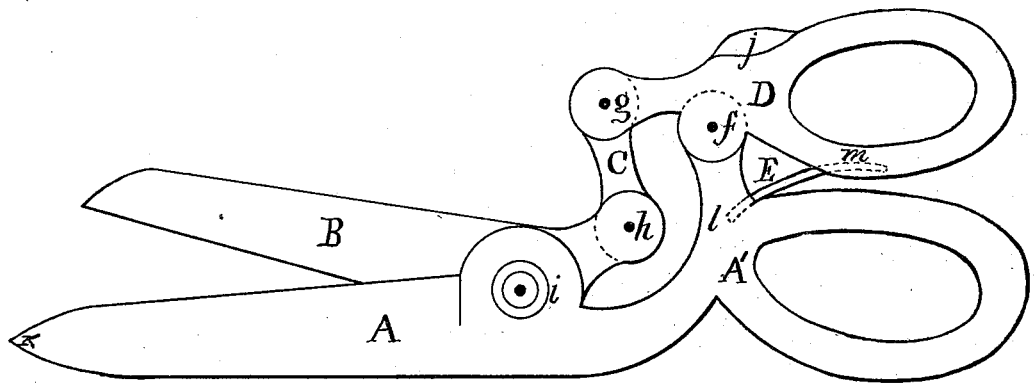

UNITED STATES PATENT OFFICE.

DANIEL A. FOLTZ, OF NEW RINGGOLD, AND AARON MILLER, OF RINGTOWN, PENNSYLVANIA; SAID MILLER ASSIGNOR TO SAID FOLTZ.

IMPROVEMENT IN SHEARS.

Specification forming part of Letters Patent No. 192,426, dated June 26, 1877; application filed May 21, 1877.

*To all whom it may concern:*

Be it known that we, DANIEL A. FOLTZ, of New Ringgold, and AARON MILLER, of Ringtown, both in the county of Schuylkill and State of Pennsylvania, have invented a new and useful Improvement in Shears or Scissors, which improvement is fully set forth in the following specification, reference being had to the accompanying drawing.

The object of our invention is to provide shears or scissors that will operate easily and effectively, and that can be made of lighter materials than ordinary shears, yet, by the peculiar operative mechanism, will bear as much strain as other shears made twice as heavy.

To more particularly describe our invention we will refer to the drawing.

A is the lower blade, and A' the handle, made in one piece, and having the joints $i$ and $f$. B is the upper blade, jointed to A at $i$. C is a connecting-bar, and D is the upper handle of the shears. The connecting-bar C is jointed at $g$ and $h$ with the handle D and the blade B, and the handle D is also jointed at $f$ with the lower handle A' and blade A. E is a spring, secured to the handle A' at $l$, and working in a slot in the handle D at $m$. $j$ is merely a thumb-rest. The point of the end of the blade A at K projects a short distance beyond the end of the blade B, and is made round or flat, but is not sharpened, as the other part of the blade is. When the blades A and B are opened wide the back end of the blade B, between the joints $i$ and $h$, will just clear the lower handle A' immediately below the joint $h$, and the spring E is made of sufficient strength to force the blades apart to their full extent.

In operating the shears the lower blade lies flat on the cutting-board, while the upper blade only works. The lower blade, being longer than the upper, and having a round or flat projecting point, will hold the material that is being cut, and prevent it from dropping flat on the board when a full cut is made.

We propose to make these shears of much lighter weight than ordinary ones, making them more convenient to work with and easy to handle. We gain by our arrangement of parts increased power, steadiness of the shears while in use, ease of operation, the self-opening of the blades and handles, lessening the labor considerably thereby, and thus enabling the operator to do a greater amount of work than he could do with other shears. In cutting heavy cloth, operators often press down the upper blade with their left hands. This destroys the cutting-edge of the blades. With our shears this is never necessary, and the edges are kept keen and sharp a much longer time.

We place the projection on the handle A', where the joint $f$ operates, as near the end of the handle as possible, and we form the end of the blade B, between the joints $i$ and $h$, at an angle to the blade B. This arrangement, in connection with the connecting-bar C, gives us the greatest attainable amount of power, and insures a greater ease of working.

Having thus described our invention, we claim as new and desire to secure by Letters Patent—

The combination, in shears or scissors, substantially as described, of the blades A and B, the handles A' and D, the connecting-bar C, the spring E, and the joints $i$, $h$, $g$, and $f$.

DANIEL A. FOLTZ.
AARON MILLER.

Witnesses:
SALEM W. KOCH,
S. I. WILLINGALE.